United States Patent
Beckmann et al.

(10) Patent No.: US 7,590,073 B2
(45) Date of Patent: Sep. 15, 2009

(54) METHOD FOR REGISTERING A COMMUNICATIONS DEVICE, AND AN ASSOCIATED COMMUNICATIONS DEVICE AND REGISTRATION UNIT

(75) Inventors: Mark Beckmann, Braunschweig (DE); Maik Bienas, Hannover (DE); Holger Schmidt, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 565 days.

(21) Appl. No.: 10/996,753

(22) Filed: Nov. 24, 2004

(65) Prior Publication Data

US 2005/0131989 A1 Jun. 16, 2005

(30) Foreign Application Priority Data

Nov. 26, 2003 (DE) ................. 103 55 265

(51) Int. Cl.
*H04L 12/28* (2006.01)
(52) U.S. Cl. ...................... 370/254; 370/401
(58) Field of Classification Search ............. 370/252, 370/254, 255, 389, 401; 455/435.1
See application file for complete search history.

(56) References Cited

U.S. PATENT DOCUMENTS

| | | | | |
|---|---|---|---|---|
| 5,819,178 | A * | 10/1998 | Cropper | 455/433 |
| 6,246,670 | B1 * | 6/2001 | Karlsson et al. | 370/244 |
| 6,856,624 | B2 * | 2/2005 | Magret | 370/392 |
| 7,212,505 | B2 * | 5/2007 | Saint-Hilaire et al. | 370/328 |
| 2002/0024943 | A1 * | 2/2002 | Karaul et al. | 370/338 |
| 2002/0039367 | A1 * | 4/2002 | Seppala et al. | 370/401 |
| 2002/0107018 | A1 * | 8/2002 | Nakamura et al. | 455/433 |
| 2002/0188868 | A1 * | 12/2002 | Budka et al. | 713/201 |
| 2003/0104807 | A1 * | 6/2003 | Momona | 455/422 |
| 2003/0177267 | A1 * | 9/2003 | Orava et al. | 709/245 |
| 2004/0066749 | A1 * | 4/2004 | Watanabe | 370/242 |
| 2004/0156394 | A1 * | 8/2004 | Westman | 370/471 |
| 2004/0203765 | A1 * | 10/2004 | Das et al. | 455/435.1 |

* cited by examiner

*Primary Examiner*—Hong Cho
(74) *Attorney, Agent, or Firm*—King & Spalding L.L.P.

(57) ABSTRACT

To register a communications device (UE1) in a communications network (CN), one or more temporary communications addresses (NI1, NI2) are negotiated between the communications device (UE1) and at least one registration unit (AV1) of the communications network (CN), the temporary communications addresses being valid only for a predeterminable utilization period (ZT1, ZT2). The temporary communications address (NI2) concerned is registered by the registration unit (AV1) for this utilization period (ZT2).

12 Claims, 7 Drawing Sheets

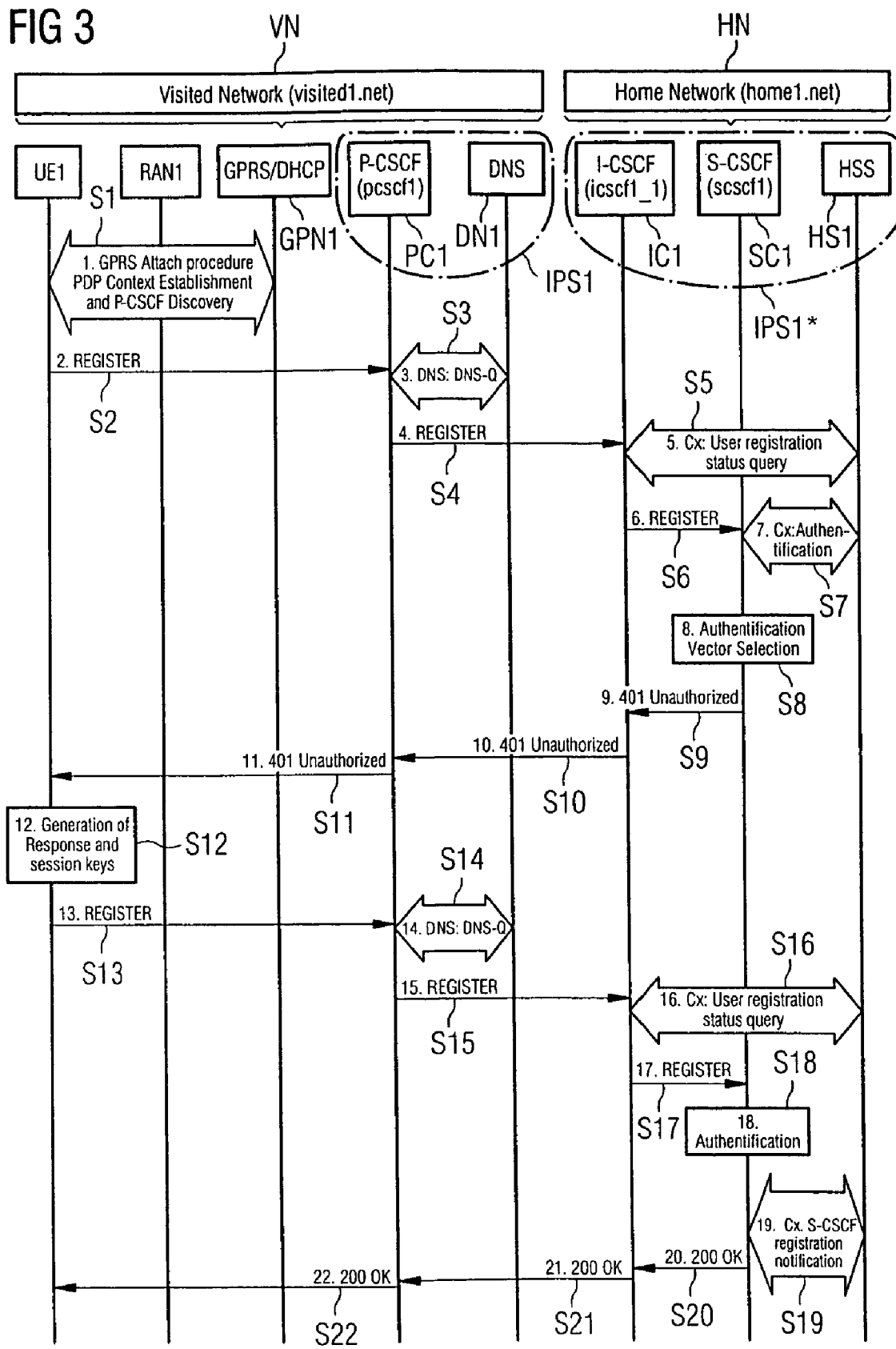

REGISTER sip: registrar.home1.net SIP/2.0
Via: SIP/2. 0/UDP [5555: :aaa:bbb:ccc:ddd]; comp=sigcomp;branch=z9hG4bKnashds7
Max-Forwards: 70
P-Access-Network-Info: 3GPP-UTRAN-TDD; utran-cell-id-3gpp=234151D0FCE11
From: <sip: user1_public1@home1.net>;tag=4fa3
To: <sip:user1_public1@home1.net>
Contact: <sip: [5555: : aaa:bbb:ccc:ddd]; comp=sigcomp>,expires=600000
Call-ID: apb03a0s09dkjdfglkj49111
Authorization: Digest username="user1_private@home1.net", realm="registrar.home1.net", nonce="",
   uri="sip:registrar.home1.net", response=""
Security-Client: ipsec-3gpp; alg=hmac-sha-1-96; spi=12345678; port1=1357
Require: sec-agree
Proxy-Require: sec-agree
CSeq: 1 REGISTER
Supported: path
Content-Length: 0

SIP1

```
REGISTER sip:scscf1.home1.net SIP/2.0
Via: SIP/2.0/UDP [5555::aaa:bbb:ccc:ddd];branch=z9hG4bKnashds7
Max-Forwards: 70
From: <bob_public1@home1. net>;tag=4fa3
To: <NicknameX_public1@home1.net>, <NicknameY_public1@home1.net>; prio=decreasing
                                  ⎿NI1                    ⎿NI2
Call-Id: lmaa03a0s09dkjdfgtkj49111
CSeq: 1 REGISTER
Contact: <[5555::aaa:bbb:ccc:ddd]>;expires=3600
         ⎿C01                     ⎿ZT1=ZT2
Content-Length: 0
```

SIP/2.0 200 OK
Via: SIP/2.0/UDP [5555: :aaa:bbb:ccc:ddd]; branch=z9hG4bKnashds7
Max-Forwards: 70          NI2
From: <bob_public1@home1.net>;tag=4fa3
To: <NicknameY_public1@home1.net>;tag=9845g7s
Call-Id: lmaa03a0s09dkjdfglkj49111
CSeq: 1 REGISTER
Contact: <[5555: :aaa:bbb:ccc:ddd]>;expires=3600
Content-Length: 0                    C01
```

SIP/2.0 200 OK
Via: SIP/2.0/UDP [5555: :aaa:bbb:ccc:ddd]; branch=z9hG4bKnashds7
Max-Forwards: 70
From: <bob_public1@home1.net>;tag=4fa3
To: <dsfkjhsdkfh8409d_public1@home1.net>;tag=9845g7s
Call-Id: lmaa03a0s09dkjdfglkj49111
CSeq: 1 REGISTER
Contact: <[5555: :aaa:bbb:ccc:ddd]>;expires=3600
Content-Length: 0                    C01
```

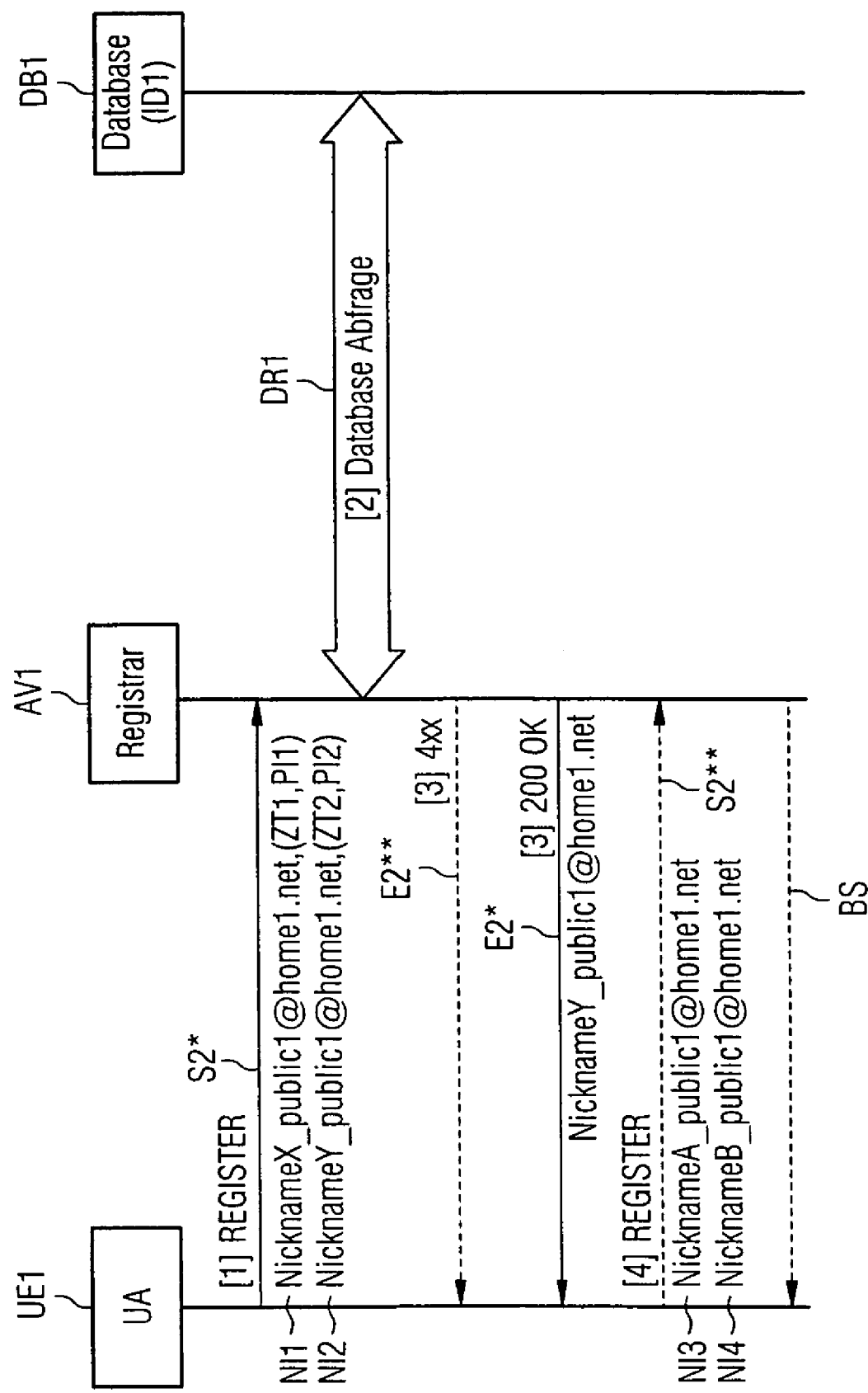

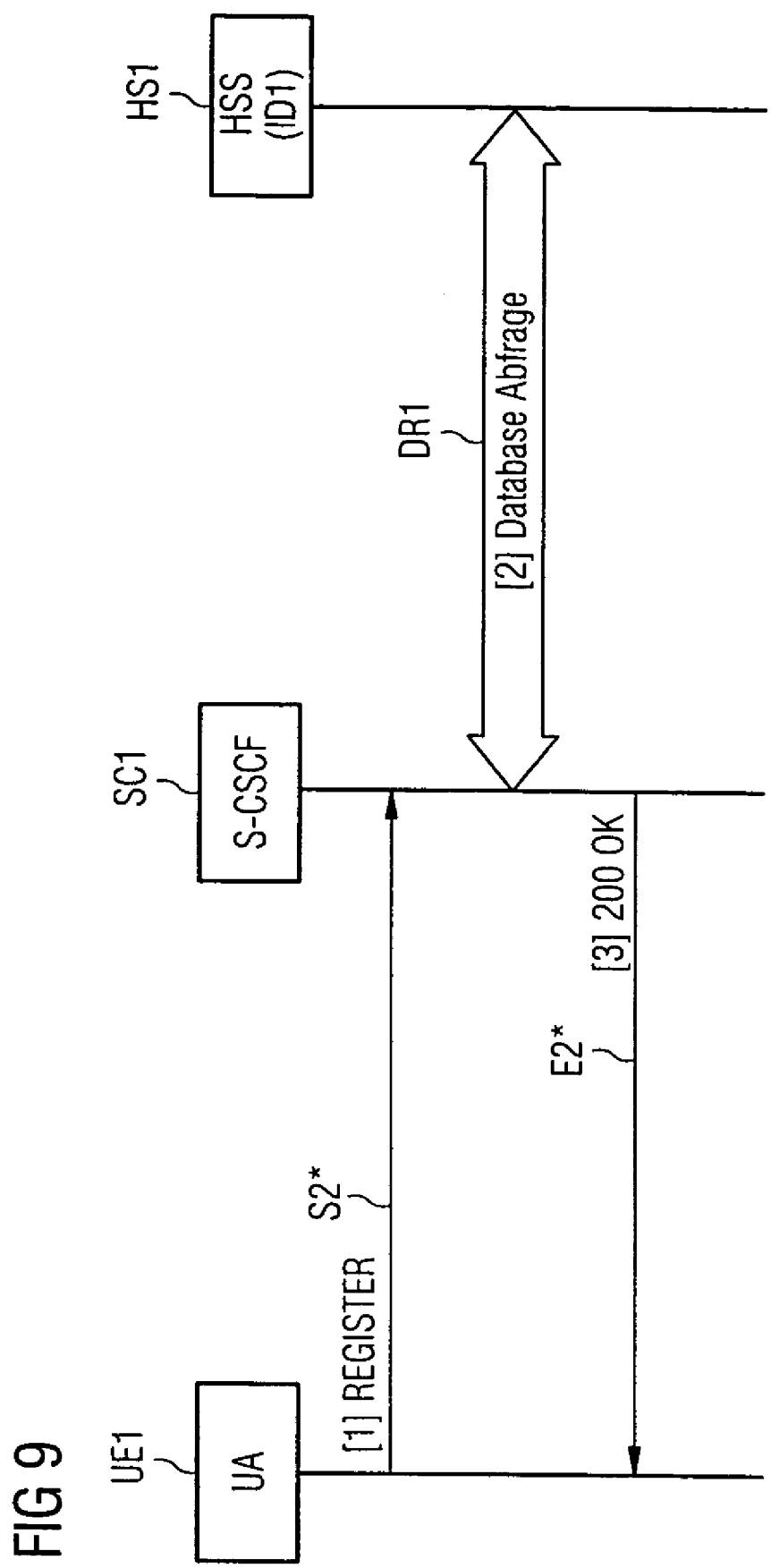

METHOD FOR REGISTERING A COMMUNICATIONS DEVICE, AND AN ASSOCIATED COMMUNICATIONS DEVICE AND REGISTRATION UNIT

BACKGROUND OF THE INVENTION

It is desirable in practice to effectively prevent any possible unauthorized access to the permanently or long-lastingly assigned communications address of a communications device by another communications device. Such object is that to which the present invention is directed.

Accordingly, a method is provided for registering a communications device in a communications network, wherein one or more temporary communications addresses are negotiated between the communications device and at least one registration unit of the communications network, the communications addresses being valid only for a predeterminable utilization period, and the respective temporary communications address being registered by the registration unit for such utilization period.

Through the use of a temporary communications address instead of the permanently or firmly assigned communications address, the communications device remains contactable or addressable by other communication addresses only under this temporarily allocated (i.e., dynamic) communications address. After a predetermined utilization period has expired, the respective temporary communications address of the communications device becomes invalid. Only during the period of validity of the respective temporary communications address can the communications device be validly addressed and accessed by other communications devices. In this way, the communications device can be protected against other communications devices obtaining undesired access to its true communications address. Through the temporary assignment of an alternative or replacement address in place of the actual firmly assigned communications address, the communications device remains addressable only for a predeterminable period of time, so that it is particularly secure against manipulative access by third parties. For example, the persistent sending of "spams" can be effectively prevented in this way since, after the pe-address of the communications device remains hidden from or invisible to other communications users.

The present invention also relates to a communications device and a registration unit with capabilities for implementing the method as described above.

Additional features and advantages of the present invention are described in, and will be apparent from, the following Detailed Description of the Invention and the Figures.

BRIEF DESCRIPTION OF THE FIGURES

FIG. 3 shows in detail the temporal sequence of signaling messages between the radiocommunications device to be registered with components of the GPRS radiocommunications system and its assigned IP multimedia CN subsystem from FIG. 1 or 2 for initially registering the permanently assigned communications address.

FIG. 4 shows the content of a registration request message of the radiocommunications device in the flow of signals shown in FIG. 3 for initially registering its permanently assigned communications address.

FIG. 5 shows the content of a registration request of the radiocommunications device of the signal flow diagram shown in FIG. 3 which, according to a first variant of the inventive method, contains temporary communications addresses.

FIGS. 6, 7 each show a confirmation signal which, upon request for registration of the radiocommunications device shown in FIG. 3, is sent by a registration or address administration unit in the radiocommunications network of the radiocommunications system shown in FIG. 1 back to the radiocommunications device.

FIGS. 8, 9 show two variants of the inventive method for allocating a temporary communications address to the radiocommunications device shown in FIGS. 1 to 3, under which it is addressable by other radiocommunications equipment.

Elements with the same function and mode of operation are each given the same reference characters in FIGS. 1 to 9.

DETAILED DESCRIPTION OF THE INVENTION

Figure 1:
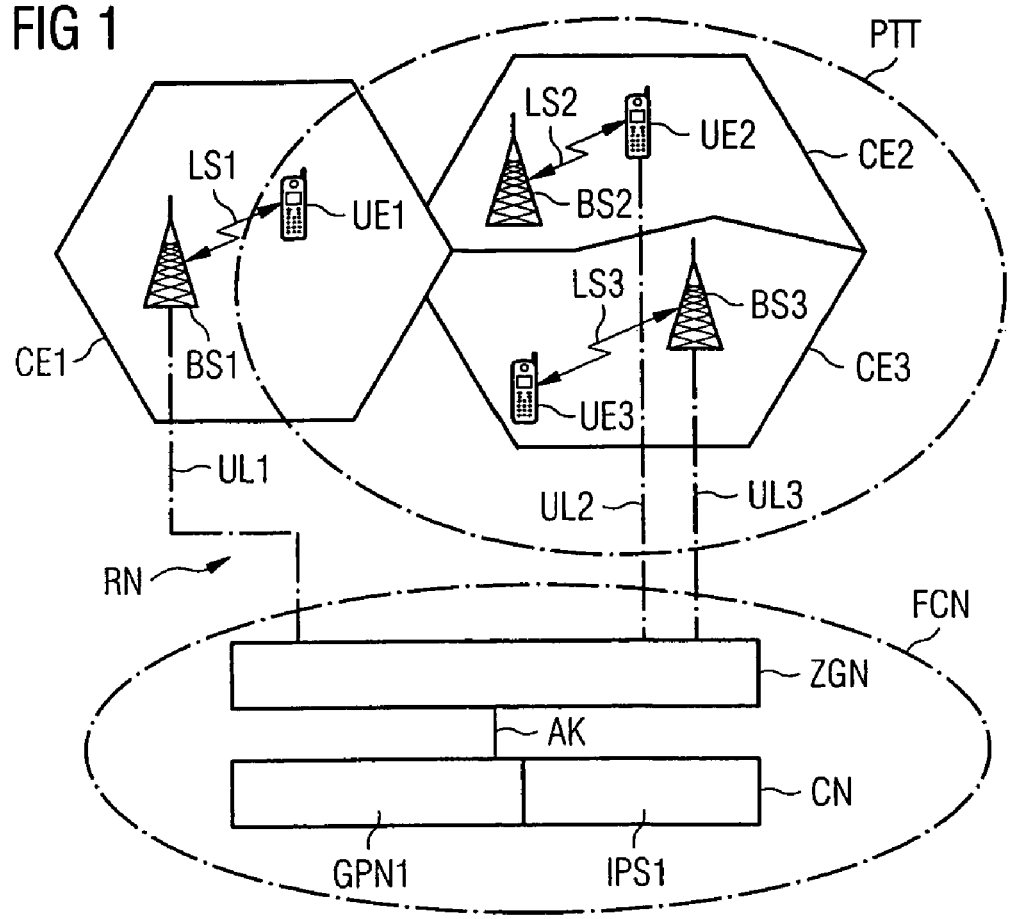
FIG. 1 shows in diagrammatic view the basic structure of a radiocommunications system according to 3GPP (Third Generation Partnership Project) specifications with the integration of an IP (Internet Protocol) multimedia CN (Core Network) subsystem for implementing the method according to the present invention.

FIG. 1 shows, by way of example, the basic structure of a UMTS (Universal Mobile Telecommunication System) radiocommunications system RN having a large number of radio cells which are supported in radio-engineering terms by base stations. In the embodiment shown in FIG. 1, only three base stations BS1 to BS3 with their associated radio cells CE1 to CE3 are included in the drawing for the sake of clarity. These base stations are connected via transmission lines UL1 to UL3, shown as dot-dash lines, to the components of a radio network FCN. This radio network has a radio access network ZGN, to which a core network CN is additionally connected via appropriate communication links AK, the core network containing a GPRS core network GPN1 and an IP (Internet Protocol) multimedia core network subsystem IPS1. The IP multimedia core network subsystem is abbreviated in the UMTS standard to IMS. Details relating to the IP multimedia core network subsystem are given, in particular, in the relevant specification 3GPP TS23. 228: "IP Multimedia Subsystem (IMS); Stage 2." It is particularly desirable for a multimedia conferencing service to be implemented for this core network extended with the IP multimedia core network subsystem. For this purpose, the multimedia conferencing service is usefully based on an architecture and on protocol components which are executed in compliance with the conferencing framework of the IETF (Internet Engineering Task Force) (see, in particular, the IETF Sipping Working Group: Draft-IETF-Sipping-Conferencing-Framework-00). This multimedia conferencing service is required to provide for generating, managing, terminating, entering and leaving multimedia conferences. It is also required to include methods for notifying the conferencing communications devices or their users participating in a certain multimedia conference about specific information and rules relating to such conference. Within the respective multimedia conferencing service, any media types and/or formats can be exchanged between the user devices. This covers, for example, audio, video, voice, text, data, instant messaging, gaming conferences, etc., as well as combinations thereof. The principles applied here in the embodiment of a UMTS radiocommunications system also may, of course, be applied generally to other communications systems and their communications devices.

In the IP multimedia core network subsystem IPS1 (abbreviated to IMS), each permanently filed user identifier, in particular a public user identity (abbreviated to PUID), uniquely identifies a certain user. At the same time, several such PUIDs may well be registered in the IMS for one and the same user. The user identifier PUID which is formed of or represented by a TEL-URL (Telephone Uniform Resource Locator) or a SIP-URI (Session Initiation Protocol Uniform Resource Identifier), is comparable in terms of its format with the format of a known e-mail address. One or more PUIDs are assigned statically (i.e., permanently) to the respective user by the respective mobile radiocommunications network operator in the IP multimedia core network subsystem (such as, e.g., IPS1) and stored there. The respective user can establish communications connections only if the PUID used for this purpose has been registered. This is done either implicitly or explicitly in a registration or activation procedure. In the case of implicit registration, further PUIDs filed in the core network are registered, in addition to the PUID contained in a registration request. Furthermore, only incoming communications connections can be provided for a user where the PUID concerned previously has been registered. In other words, the respective user is authorized for communications traffic under his/her PUID and is addressable by other communications devices only after his/her identifier, already statically filed in the IMS, has been activated.

In the embodiment taken from FIG. 1, for example, three radiocommunications devices, particularly mobile radiocommunications devices UE1 to UE3, are located in the radio cells CE1 to CE3. Each radiocommunications device UE1 to UE3 in this case has a radio link or air-interface link LS1 to LS3 to the base station of the radio cell in which it is currently located. The three radiocommunications devices UE1 to UE3 are logged on here in the embodiment to a PTT ("Push To Talk") service as a multimedia conferencing service. In such a PTT-conferencing service, only the operator of one of the communications devices involved in each case can dispatch a voice message, while the remaining radiocommunications devices involved can only receive this voice message. Consequently, within the PTT-conferencing service, voice and/or data can be exchanged between the radiocommunications devices involved only according to the half-duplex transmission method. This corresponds broadly to the operation of walkie-talkies known from CB radio.

As has already been described, the respective radiocommunications device UE1 to UE3 is addressed in the IP multimedia core network subsystem IPS1 via a PUID permanently assigned to it. The so-called "SIP-URI" or "TEL-URL" format is used in each case for the permanently filed PUEfD of the respective radiocommunications device. Further details about these formats are given in the specifications IETF RFC3261: "Session Initiation Protocol (SIP), "IETF RFC2396: "Uniform Resource Identifiers (URI)" and IETF RFC2806: "URLs for Telephone Calls." A "SIP URI" communications address or identifier uses a format which is similar to that of the known e-mail address ("mailto URL").

For example,
sip:Holger. Schmidt@siemens. com
or tel:+4953419061818
or more generally: sip:UserPart@HostPart
denotes a valid "SIP URI" or "TEL URL" communications address.

Several such PUIDs can be assigned to each radiocommunications device in the IP multimedia core network subsystem. The PUIDs are used for addressing the respective radiocommunications device so that, with their help, a SIP request signal or SIP request from a user agent client (UAC) can be routed or communicated to the user agent server (UAS).

SIP (Session Initiation Protocol) has been selected within 3GPP as the signaling protocol for the IP multimedia core network subsystem (IMS). The session initiation protocol (SIP) is what is referred to as an application-layer control protocol; i.e., a signaling protocol for setting up, modifying and releasing multimedia sessions. These multimedia sessions may include, for example, Internet telephone calls (Voice Over IP) and similar applications. Through the use of SIP, users can be invited and added to existing sessions, and the composition of the multimedia session changed. SIP has, and the composition of the multimedia session changed. SIP has, among other things, facilities for assigning addresses or mapping addresses, for pinpointing the user device called in each case and for rerouting calls. Elements of an architecture based on SIP are designated user agents (UA), proxy servers, redirect servers and location servers. An SIP user agent is an end system that permits the respective user of a radiocommunications device to participate in an SIP session. An SIP user agent can, furthermore, be subdivided into an SIP user agent client (UAC) and a user agent server (UAS). A user agent client generates and sends requests (SIP requests), while a user agent server responds to requests (SIP responses). A UMTS-compatible, SIP-capable terminal device (user entity: abbreviated to UE), particularly a mobile radiocommunications device, contains a user agent; i.e., both a user agent client (UAC) and a user agent server (UAS).

Figure 2:
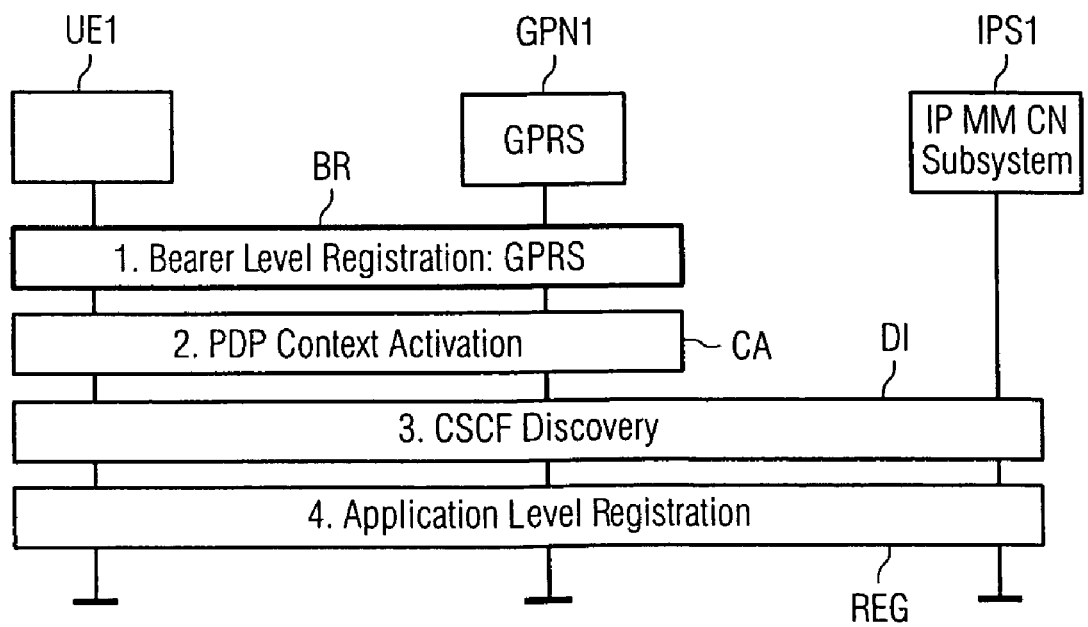
FIG. 2 shows in diagrammatic view the temporal sequence of registration procedures of a radiocommunications device which is logging on to the GPRS (General Packet Radio System) radiocommunications network and its assigned IP multimedia CN subsystem from FIG. 1 as before under its permanently assigned communications address.

FIG. 2 shows the temporal course of the procedures to be run through during the initial registration or logging on of a radiocommunications device such as, for example, UE1 from FIG. 1. Details of this are given, in particular, in the specification 3GPP TS 23. 221: "Architectural Requirement," paragraph 8. 1. Activation or registration of the PUID filed in each case for the radiocommunications device UE1 is carried out in the REG procedure designated "4. Application Level Registration." Initially, registration of the respective radiocommunications device, such as UE1 with the GPRS core network GPN1, is carried out at bearer or GPRS level with the aid of a first procedure BR entitled "1. Bearer Level Registration: GPRS." Within the scope of the present invention, registration or logging on is, in general, deemed to refer to application-level registration, unless explicitly stated otherwise. GPRS level registration (GPRS Attach) is carried out during commissioning of the respective radiocommunications device such as UE1. To access the IMS, such as IPS1, and to exchange IP data on the OSI (Open Systems Interconnection) network level, an IP address is dynamically assigned to the respective radiocommunications device. To obtain an IP address which is identical in the UMTS system to the PDP (Packet Data Protocol) address, the second procedure CA from FIG. 2 entitled 2. PTP Context Activation is activated. Within this procedure, a primary PDP context is activated, provided none as yet exists. Otherwise, a secondary PDP context can be activated. One or more secondary PDP contexts are logically assigned to a primary PDP context. They share use of the same IP address and the same APN (Access Point Name), which is an element of the PDP context. Details about this are given in the specification 3GPP TS 23. 060 "GPRS Service Description, Stage 2." They differ in terms of the various QoS (Quality of Service) profiles of the different secondary PDP contexts.

In the third procedure DI from FIG. 2 entitled "3. CSCF Discovery," the address, particularly the FQDN (Full Qualified Domain Name) or IP address, of the particular P-CSCF (Proxy-Call State Control Function) responsible of the IMS IPS1 is communicated to the radiocommunications device UE1. This also may be carried out as part of the signaling within the PDP context activation procedure CA from FIG. 2 or through the use of a DHCPv6 protocol (Dynamic Host Control Protocol). The radiocommunications device UE1 may then register or log on with the S-CSCF (serving CSCF) component in the IMS of the home core network (i.e., of the home network), via the fourth procedure REG entitled "4. Application Level Registration" via the P-CSCF component of the IMS. Here, the S-CSCF component in the IMS of the home core network takes on the role of an SIP (Session Initiation Protocol) registrar.

FIG. 3 shows the sequence of signaling messages for initially registering or logging on a PUID for the radiocommunications device UE1 in the IMS IPS1 of the home core network HN. Details of this flow of signals are given, in particular, in the specification 3GPP TS 24.228 "Signaling Flows [in] the IP Multimedia Subsystem based on SIP and SDP." In the embodiment shown in FIG. 3, the radiocommunications device UE1 is located, for example, in the radio cell of an external radiocommunications system, which is designated VN here and carries the name "Visited Network" (visited1.net). Control and verification signals for logging on the radiocommunications device under its PUID in the IMS of the home core network HN are exchanged between the radiocommunications device UE1 and the components of this visited external radiocommunications network VN as well as between the components of the external radiocommunications network VN and components of the home core network HN. In detail, the radiocommunications device UE1 sends via its air interface LS1 a control signal S1 through the intermediary of the radio access network RAN1 of the radiocommunications system currently being visited by it to its GPRS core network GPN1, in order to log on there. To this end, the control signal S1 contains together the activation procedures BR, CA, DI from FIG. 2. These activation procedures also may be started via separate control signals.

After its GPRS-level registration, the radiocommunications device UE1 transmits a registration request signal S2 entitled "2. Register" to a P-CSCF component PC1 (with the name proxy call state control function) of the IP multimedia core network subsystem IPS1 of the visited external radiocommunications network VN. This registration request signal S2 contains a user identity PUID with which the user of the radiocommunications device UE1 would like to be explicitly registered. After receiving the registration request signal S2, the P-CSCF component PC1 inquires of an assigned domain name server (abbreviated to DNS) DN1 which I-CSCF component and, thus, which home core network HN or IMS is responsible for the PUID of the user. The user identifier PUID is thus mapped by the domain name server DN1 to the IP address of the I-CSCF component. The associated exchange of signals between the P-CSCF component PC1 and the domain name server DN1 is indicated in FIG. 3 by a double arrow S3. Based on this queried information that the user identifier or PUID is assigned to a certain IMS core network, the P-CSCF component PC1 forwards the registration request signal S4 to the I-CSCF (Interrogating Call State Control Function) component IC1 responsible in the IMS PS1* of the home core network HN. The I-CSCF component IC1 constitutes here an entry point or access point to the IMS IPS1*. Pursuant to a request signal S5, the I-CSCF component IC1 requests from a database server, in particular the HSS (Home Subscriber Server) of the IMS IP1*, all the information necessary for forwarding the request. To this end, the I-CSCF component sends, among other things, the PUID to the HSS. The I-CSCF component then selects a suitable S-CSCF component as registrar and forwards the request via the message S6 to the S-CSCF component SC1 identified as responsible. If the PUID were not known to the HSS, then at this point termination of the registration procedure would occur and an error message would be transmitted to the radiocommunications device UE1. If the registration message has not been equipped with integrity protection, then the radiocommunications device UE1 is challenged at this point (Challenge). To this end, the S-CSCF component SC1 requests from the HSS an authentication vector via a request signal S7, which contains all the parameters necessary for this. The challenge is communicated to the radiocommunications device UE1 via messages S9 to S11. The radiocommunications device UE1 then generates the necessary response to the challenge, which is communicated via messages S12 to S17 to the S-CSCF component SC1. A check is then made in step S18 "18. Authentication" as to whether the response is correct. If this is the case, then the PUID is registered in the S-CSCF component SC1. Registration is indicated to the HSS via a message S19. Messages S20 to S22 indicate to the radiocommunications device UE1 successful registration of the PUID. At the same time, the implicitly registered PUIDs are likewise communicated to the radiocommunications device UE1.

Pursuant to this registration procedure, not only is the PUID of the user of the radiocommunications device UE1 registered, but a localization service is implemented at the same time. During registration, the current communications address, particularly the PUID of the user of the radiocommunications device UE1, is associated with the respective current contact address, particularly the IP address of the radiocommunications device UE1; i.e., set in relation to one another. The current contact address of the radiocommunications device UE1 here contains its current IP address or FQDN (Fully Qualified Domain Name). This contact address is either of a static or a dynamic nature. As described earlier, the IP address is currently assigned to the radiocommunications device or UE (User Equipment) during the procedure "2. PDP Context Activation" from FIG. 2. It is also possible for a static IP address to be used which is stored; e.g., on the USIM (UMTS Subscriber Identity Module) or ISIM (IMS SIM) card. In this way, a link (i.e., a logical operation), is generated in the S-CSCF component SC1 of the home IMS IPS1* between the current contact address of the radiocommunications device UE1 and the user identifier; in particular, the PUID of the current user of the radiocommunications device UE1. This association data is then stored therein. If a message is sent to the user identifier, in particular the PUID, of the user of the radiocommunications device UE1 by another radiocommunications device such as UE2, then the S-CSCF component SC1 calls up this association data in the home core network HN and then forwards the communications message to the current contact address of the user. In this way, the user concerned constantly may be addressed or accessed under his/her permanently assigned user identifier; in particular, PUID. Registration, therefore, provides a method by which the home core network can always find out the current location or the current location address of the respective user. It is also possible to register a PUID from several terminal devices. In the IMS of the home core network, it is also possible upon initial registration for further PUIDS in the S-CSCF component to be associated simultaneously with the current contact address of the respective user. Here, the S-CSCF component may resort to further PUIDs of the user in the database of the database server (HSS), so that it is not necessary to transmit further PUIDs from the respective radiocommunications device; such as, for example, UE1 to the S-CSCF component in the home IMS such as IPS1*. The link between PUIDs which are already filed in the database of the database server, such as HS1 of the home EMS (e.g., IPS1*) with the current contact address of the respective user is, as was described above, designated implicit registration. In contrast, the transfer of the PUID to be registered in a particular case from the respective radiocommunications device to the S-CSCF component, such as SC1 of the home IMS, is called explicit registration.

FIG. 4 shows the registration request message S2 from FIG. 3 in detail. The PUID of the user of the radiocommunications device UE1 to be registered is contained in the "To" header field SIP1 of the registration request signal S2. The PUID of the user who is the origin of this message S2 is given in the field entitled "From." In the present embodiment, in which the user of the radiocommunications device UE1 registers himself/herself, the same PUIDs are contained in the "To" header field and in the "From" header field. The contact address to be associated with the PUID in the form of an SIP URI, in particular an IP address without a user part, is entered in the section entitled "Contact header" of the registration request message S2. The contact address contains the current IP address or FQDN address of the radiocommunications device UE1 at which the user currently may be accessed.

In this way, the respective radiocommunications device can be registered in the IMS of its home radiocommunications system only under a PUID that previously has already been permanently stored there in the database server; such as, e.g., HS1. In this way, only a fixed, invariant assignment of one or more PUIDs to the respective user is provided. If a user is then registered under his/her PUID in the IMS of his/her home radiocommunications network, then he/she is also addressable under this PUID by other communications users. The PUIDs are generally made accessible through public directories or, for example, printed on visiting cards.

In order to give consideration to personal identity and security aspects in this regard, it is desirable under certain circumstances not to disclose or make accessible the identity of the respective user to other users. In other words, passing on or making available the permanent or static PUID of the respective user for predeterminable communication connections to other users is viewed as being too risky or impermissible. Identity protection, in particular for a user group at a conferencing service such as, for example, a multimedia conferencing service, from external communications devices not taking part, but possibly also within the user group itself, is a relevant basic function. In order to achieve a situation where the identity of the respective user of a certain radiocommunications device remains anonymous (i.e., inaccessible), to other radiocommunications devices, at least one temporary communications address is generated in addition to or independently of the respective permanently (i.e., statically), assigned communications address by this radiocommunications device or by a registration or address administration unit assigned to this radiocommunications device in the radio network of the radiocommunications system. This temporary communications address is registered in the address administration unit and associated for a predeterminable period of time with the current contact address of the radiocommunications device, which also may be associated with a statically assigned communications address. Only this temporary communications address of the radiocommunications device is then made accessible to one or more other radiocommunications devices for communication exchange, while the permanently assigned communications address remains invisible or hidden from these other radiocommunications devices.

Through the generation and registration of temporarily valid user identities, particularly in the form of temporary PUIDs (Temporary Public User Identities), multimedia sessions can be established between users, particularly in the IMS, without it being necessary for their permanent or static PUIDs to be used and disclosed to one another. In this way, the personal identity and security philosophy is adhered to consistently, even in the establishment of any multimedia sessions outside the conference environment. It also may be advantageous for a reference right to be assigned in each case by the respective radiocommunications device or address administration unit logging on temporarily in each case to call up its temporary communications address. This reference right is used to control access or the blocking of access to the temporary communications address of this radiocommunications device.

In order to then establish a communications service, in particular a multimedia session, between several user agents, without resorting to the statically assigned user identities of the IMS in the home core network, one or more temporarily valid user identities are negotiated and registered between the respective user of a user agent, such as a participating radiocommunications device, and the registration or address administration unit in the IMS. Only under the temporarily valid user identity or communications address can the user participating in the communications service be accessible in the IMS to the other users taking part. The use of temporarily valid communications addresses preserves the anonymity of the user participating in each case. The permanently assigned communications address of the respective user remains hidden from other users both within the respective communications service and externally from other communications users so that unauthorized or improper access to the statically assigned communications address is largely avoided. The temporarily valid user identity or communications address assigned corresponds in terms of its function to a pseudonym of the respective user for a certain predetermined period of time and purpose.

To register a temporary user identity or communications address, its uniqueness is a precondition for enabling fault-free identification of the respective user for other users and network components. To this end, the respective user sends one or more self-generated temporary user identities to a registration or address administration unit; in particular, to a network element which handles the tasks of an SIP registrar, as it is called.

FIG. 8 illustrates a first advantageous method for the negotiation and registration of a temporarily valid communications address; for example, for a user agent UA of the radiocommunications device UE1. The user identities are, in accordance with the specification IETF RFC3261 "Session Initiation Protocol (SIP)," generally termed in this embodiment "addresses-of-record (AOR)." Several user identities are sent by the user agent UA of the radiocommunications device UE1 to the registrar or the registration unit AV1 in the network of the radiocommunications system RN (see FIG. 1) in a registration request signal S2* entitled "(1) Register." The registrar AV1 is in this case represented in the IMS by the S-CSCF component of the home core network (see FIG. 3). In the embodiment shown in FIG. 8, the registration request signal S2* contains, for example, two temporary user identities NI1, NI2. For these, time-limited (i.e., temporary), filing by the registrar AV1 in a database or memory unit DB1 of the home core network is desired on the part of the user of the radiocommunications device UE1. The content of the registration request signal S2* is reproduced in detail in FIG. 5. The first temporary user identity NI1 is formed there by an AoR or PUID with the name "NicknameX_public:1mailto:

1@home1@.net@home1.net." The second temporary communications address NI2 proposed by the user of the radiocommunications device UE1 has the name "NicknameY_public1@home1.net" here. A utilization period ZT1 and a certain priority PI1 are specified here for the proposed first temporary communications address NI1. In FIG. 8, these parameters are placed in brackets after the temporary communications address NI1. Correspondingly, a utilization period ZT2 and a rank or priority PI2 for the processing sequence in the registrar AV1 are specifically assigned to the second proposed temporary communications address NI2. If, as here, several user identities are sent by the respective user agent of the radiocommunications device of the respective user to the registrar, then it is appropriate for a defined registration priority to be specified, in observance of which one of the proposed AoRs (i.e., expressed in more general terms), temporary communications addresses, is registered by the registrar. According to a first simplified selection criterion, the positions of the respective AoRs within the transmitted proposal list indicate their priority relative to one another. In this way, it is indicated that, for example, the first temporary communications address listed in the list and not yet allocated is to be registered. In FIG. 8, the registrar AV1 checks after receiving the registration request signal S2* whether the transmitted temporary communications addresses NI1, NI2 have already been allocated in its domain. To do this, the registrar AV1 searches through via interrogation signals DR1 the database DB1 assigned to it. All temporarily and permanently allocated communications addresses, in particular AoRs of the domain, are stored in this database DB1. If at least one of the proposed temporary communications addresses transmitted from the radiocommunications device UE1 to the registrar AV1 has not yet been allocated, then the registrar AV1 registers this temporary communications address proposed by the radiocommunications device UE1. In the embodiment shown in FIG. 8, the registrar AV1 establishes that the communications address NI1 transmitted with the highest priority PI1 (NicknameX_public1@home1.net) in the registration request signal S2* has already been registered by another user agent in the database DB1 and is therefore no longer available for further allocation. The registrar AV1 therefore registers the second temporary communications address NI2 transmitted by the radiocommunications device UE1 with the name "NicknameY_public1@home1.net." The registrar also generates an association or link ("binding") with the current contact address CO1 (see FIG. 5) of the radiocommunications device likewise contained in the registration request message S2*. Since the link is made solely between the temporarily allocated communications address NI2 and the current contact address CO1 of the radiocommunications device UE1, this association likewise allows no inferences to be drawn as to the user of the radiocommunications device UE1 or no further contact can be made using it after the validity of the temporary communications address has expired. This applies, in particular, where a dynamic IP address is used for the contact address associated with the temporary communications address. It is therefore useful to use a new contact address, in particular an IP address, dynamically for all messages connected with the temporary AoR. This can be done, for example, in the IMS by activating and using a new primary PDP context.

After registration of the proposed, second temporary communications address NI2, the registrar AV1 sends the registered temporary communications address NI2 in a confirmation signal E2* (see also FIG. 6) back to the radiocommunications device UE1. Consequently, the user agent UA in the radiocommunications device UE1 now knows that the second temporary communications address NI2 of his/her temporarily proposed communications addresses has been accepted by the registrar AV1 and that he/she is now, under this communications address NI2, temporarily accessible for the specific utilization period ZT2 to other users.

If the proposed temporary communications addresses transmitted by the user agent UA of the radiocommunications device UE1 to the registrar AV1 in the registration request signal S2* have already been allocated, the registrar AV1 then sends an error message E2 back to the radiocommunications device UE1. In the embodiment shown in FIG. 8, the error message E2 (see also FIG. 7) includes, for example, a 4XX message (e.g., the number 403 or 409), by which the failed registration is shown to the user agent UA of the radiocommunications device UE1. This error message E2 is included in FIG. 8 only in dotted form to make it clear that it is an alternative message. After the error message E2 has been received, the user agent UA of the radiocommunications device UE1 sends to the registrar AV1 a new registration request message S2** with newly generated temporary communications addresses NI3, NI4 which are different from the first two proposed communications addresses NI1, NI2. This signaling likewise is also included in dotted form in FIG. 8. The first new communications address NI3 is represented by an AoR or PUID "NicknameA_public1@home1.net." The second proposed communications address NI4 with a lower priority relative to the first communications address NI3 is, in this example, "NicknameB_public1@home1.net." With these two newly proposed temporary communications addresses NI3, NI4, the registrar AV1 launches, in a manner analogous to the first log-on attempt, the registration procedure for the user of the radiocommunications device UE1.

If none of the communications addresses contained in the registration request message are still available on the network side in the IMS, then the registrar AV1 may itself generate a random and not yet allocated temporary communications address and register it for the particular requesting user agent. The temporary communications address, successfully registered and associated with the current contact address, is finally displayed to the user agent UA of the radiocommunications device UE1 via a confirmation message BS. This is inscribed in FIG. 8, also in dotted form.

The proposed temporary AoRs or PUIDs to be registered can, as indicated in FIG. 5, be transferred in the "To" header of the message such as, for example, S2* or E2* transmitted in each case. Alternatively, a separate header may be used for this purpose or the temporary AoRs or PUIDs transferred in the body of the respective SIP message. In this case, it is possible to specify a static AoR or PUID in the "To" header, since this is then used only in the registration procedure between the user agent UA and the registrar AV1 and not in messages between different user agents (UAs). Usefully, only the registered temporary communications address is used between these different user agents. This also applies by analogy to the transmission of the temporary AoR or PUID registered by the registrar. The registered temporary AoR also may be transferred in a separate header or in the body of the confirmation message such as, for example, E2* "200 OK."

The temporal validity of the temporary communications address negotiated and registered in each case is specified in an expire header or expire parameter as a utilization period (see in FIG. 8, ZT1, ZT2). If this value expires, then the "binding" generated is dissolved and the temporary communications address re-released; i.e., it is at this point generally available again and can be reregistered anew by any user agents. An unregistered temporary communications address cannot be used for addressing, that is the respective user agent such as UA can never be accessed again via the same temporary communications address, provided a different temporary communications address is used each time.

A user agent who would like to establish contact with another user agent, needs to know the latter's temporarily allocated communications address. For this purpose, the temporarily negotiated and registered communications address according to the present invention, in particular the AoR or PUID, is disclosed to the particular user agent who wants to enter into contact with the registered user agent. Particularly suitable for this is the "REFER method" (RFC3515), the "INFO method" (RFC2976) or the "PUBLISH method." In a "tightly coupled conference," these methods are used to distribute the temporarily valid AoR described here within the conference environment. To this end, the radiocommunications device concerned sends, for example, a suitable request signal ("INFO Request") to a so-called "conference focus," which then distributes the AoR further. Further distribution is carried out using SIP methods or other different protocols such as XCAP. Distribution can be either particularly selective or general. For selective distribution, the relevant users or user agents are specified within the stated methods. This can be done, inter alia, via the nicknames or pseudonyms or AoRs used in the conference.

Viewed overall, at least one temporarily valid communications address, in particular a PUID, is negotiated and registered between the respective user agent of a radiocommunications device and a registrar in the home core network. In a 3GPP radiocommunications system, the registrar is represented by the S-CSCF component of the home core network, to which a database server, in particular an HSS, is assigned. To register a temporary communications address for the radiocommunications device participating, in each case, in a communications service, the following steps are useful:

Generation of at least one AoR or PUID to be registered by the user agent of the radiocommunications device.

Transfer of at least one AoR or PUID from the user agent to the registrar or the S-CSCF/HSS component in the radiocommunications network.

Definition and allocation of relative priorities among the AoRs or PUIDs which are transmitted by the user agent to the registrar as a proposal.

Use of a newly allocated temporarily valid IP address/FQDN as a contact address for the transferred AoRs/PUIDs.

Check of whether the transferred AoRs or PUIDs have already been registered by the registrar or the S-CSCF component in an appropriate domain.

Registration of as yet unregistered AoRs or PUIDs with highest priority, where several have been sent by the user agent to the registrar.

Retransmission and disclosure of the AoR or PUID registered in each case to the user agent to be registered.

Generation of a random AoR or PUID by the registrar or the S-CSCF component, where the AoRs or PUIDs transferred by the user agent have already been allocated elsewhere.

The use of temporarily valid PUIDs within a multimedia conference environment is advantageous. Irrespective of this, one or more temporarily valid PUIDs or communications addresses also may be used by a user of a radiocommunications device for other communications purposes with other communications devices.

With reference to two embodiments, the content of the registration request messages S2* and S2** in FIG. 8 will be examined in greater detail below.

1st Embodiment

It is assumed here that the registration request message S2* shown in FIG. 9 contains an AoR which has not yet been allocated in the domain of the registrar AV1 or registered by another radiocommunications device. In conformance with 3GPP, the AoR is referred to below as a PUID. The registrar AV1 here includes, in conformance with 3GPP, the S-CSCF component SC1 in the IMS IPS1 of the home radiocommunications network HN shown in FIG. 3.

FIG. 9 illustrates the flow of signals between the components involved, SC1, HS1 of the IMS IPS1 and the user agent UA of the radiocommunications device UE1. A temporarily valid PUID is proposed by the user agent UA of the radiocommunications device UE1 and transmitted via a registration request signal S2* to the S-CSCF component SC1 of the IMS in the home radiocommunications network HN of the radiocommunications device UE1 (see also FIG. 5). The S-CSCF component SC1 checks via an interrogation signal DR1 whether this proposed temporarily valid PUID has already been stored in the address administration unit or database HS1. If that is not yet the case, that is if the PUID is still freely allocatable, then the S-CSCF component SC1 carries out as registrar the registration of this temporary PUID in the database HS1. The S-CSCF component SC1 communicates to the user agent UA of the radiocommunications device UE1 the result of the successful registration via the response signal E2* (see also FIG. 6). The registered PUID is advantageously contained here in this response signal E2*.

The content of the sent registration request message S2* is given in detail in FIG. 5. The "To" header field of this registration request message S2* contains at least one PUID. Here, the "To" header field has the PUIDs "NicknameX_public1@home1.net" and "NicknameY_public1@home1.net" specified in FIG. 8. Furthermore, the "To" header field contains a new parameter which specifies the prioritization of the proposed PUIDs NI1, NI2. The additional "prio=degreasing" details specify that the priority of the PUID first listed decreases outgoing. It can be useful here to create a separate header field offering the same functionality. Furthermore, a new header field can also be defined for transferring the PUIDs to be registered temporarily. In other words, the task of the "To" header line in the registration request signal S2* also may be fulfilled by other header fields.

A further advantageous variant for transferring the PUIDs consists in transferring these in a newly defined message body of the registration request message (SIP body). In this embodiment, the PUIDs of the "From" and "To" header fields are different. In the "From" header field of the message S2*, a PUID can be specified which has been stored on the ISIM (IMS SIM=subscriber identity module) of the radiocommunications device UE1. It also may be useful for the "From" and "To" header fields to contain the same PUIDs. The Contact header contains the current contact address CO1 of the radiocommunications device UE1, to which messages to be registered sent to temporary PUIDs (To header field) are transmitted. In the IMS, the contact address is identical to an IP address. The "expires" parameter ZT1=ZT2 indicates the duration (in seconds) of the registration; i.e., its period of validity. In order for it not to be possible for the identity of the user to be inferred despite the temporarily generated PUID, use of a dynamically allocated IP address, or, expressed in more general terms, contact address, is preferable. The contact address is exchanged when a session is established between the user agent participating and the registrar. Details of this can be found in the specification IETF RFC3261:

"Session Initiation Protocol (SIP)". By contrast with this, if a static IP address were used as a contact address, a connection could be established to the user even after expiration of the validity of the temporarily allocated PUID, so that the desired anonymity of the respective user would be lost. It is particularly preferable to use a separate "PDP context" for all messages which are connected with the negotiation, registration and use of the temporarily valid PUID (see FIG. 8). For this, the respective radiocommunications device activates, for example, a new "primary PDP context." Alternatively, the radiocommunications device UE1 also may reuse an existing "primary PDP context." The IP address contained in the contact address "Contact" CO1 is advantageously a dynamic (i.e., temporary) IP address.

Via the interrogation message DR1 shown in FIG. 9 the S-CSCF component SC1 checks whether the PUIDs contained in the registration request message S2* in the "To" header field have not yet been registered in the database HS1. In this embodiment, it is assumed as an outcome of this inquiry that the PUID NI1 with the name "NicknameX_public1@home1.net" has already been allocated. Consequently, the registrar SC1 registers the PUID NI2 with the name "NicknameY_public1@home1.net" and generates an association or "binding" by associating the PUID NI2 with the contact address transferred in the contact header. The registrar SC1 sends the result of this registration back to the radiocommunications device UE1 in the message E2* with the name "200 OK." This response message E2* contains the registered PUID NI2.

The registrar SC1 sends only the registered PUID NI2 in the "To" header field back to the radiocommunications device UE1. The radiocommunications device UE1 recognizes from this message E2* that registration has been successful (200 OK). The "To" header field specifies which of the proposed PUIDs NI1 or NI2 has been registered. It is also possible to transfer registered PUIDs in the so-called "P-Associated-URI" header (3GPP-specific header; i.e., it is contained only in the 3GPP profile of SIP). In this case, the "To" header is not changed by the S-CSCF component as registrar. Receipt of the response message E2* completes registration of the temporarily valid PUID NI2.

If the message body of the SIP message (SIP body) is used for transferring the PUID, then this contains only the selected or registered PUID.

2nd Embodiment

In contrast to the first embodiment, it is assumed here that all PUIDs generated by the radiocommunications device UE1 have already been allocated. Consequently, the S-CSCF component SC1 generates a PUID that has not yet been used, which is then registered for the radiocommunications device UE1. In other words, the registrar in the home core network independently generates an as yet free temporary PUID and registers the radiocommunications device UE1 under this identifier. The sequence of signaling messages is, in this case, identical to the signal flow diagram set out in FIG. 9. A difference from the first embodiment does not appear until the interrogation message DR1. The inquiry to the database HS1 returns, in the case of the second embodiment, the result that both PUIDs transferred by the radiocommunications device UE1 to the S-CSCF component SC1 are already being used. The S-CSCF component SC1 then generates a PUID that has not yet been allocated; e.g., "dsfkjhsdkfh8409d_public1@home1.net" (see FIG. 7). This is performed possibly in cooperation with the database HS1. The S-CSCF component registers the generated PUID and, in doing so, generates an association or "binding" to the contact address CO1 contained in the registration request message S2* (see FIG. 5). The successful registration with the temporary PUID allocated by the network component SC1 is then communicated to the user of the radiocommunications device UE1 via the response message BS (see FIG. 8) in place of response message E2* (see FIG. 9).

Viewed overall, at least one temporary communications address is generated in addition to or independently of the permanently assigned communications address of the communications device and negotiated between a communications device and a registration unit in the communications network assigned to this communications device. This temporary communications address is then registered by the registration unit. It is preferably associated with the current contact address of the communications device for a predeterminable period of time. Only this temporary communications address of the communications device is made accessible by the registration unit for reference by a different communications device.

It may be useful for a reference right to be allocated by the communications device or the registration unit on the network side for the temporary communications address generated in each case to be interrogated by or delivered to another communications device.

The use of temporarily allocated communications addresses can be useful particularly within communications services such as, for example, a PTT ("Push to talk") service: Within a first communications service, the permanently assigned communications address of a first communications device and the latter's temporary communications addresses of other communications services are identified by the registration unit or the first communications device. Within the first communications service, which is usefully implemented via a host/server, it is signaled between the communications devices participating there which communications device will request temporary communications addresses of other communications services of the first communications device. In particular, reference rights for requesting temporary communications addresses of the first communications device can be allocated by this first communications device or by the registration unit and transmitted within the first communications service to the other communications devices participating there. One or more temporary communications addresses are generated by the first communications device or by the registration unit assigned to this first communications device and only these temporary communications addresses are used for a predeterminable period of time within a second communications service.

Although the present invention has been described with reference to specific embodiments, those of skill in the art will recognize that changes may be made thereto without departing from the spirit and scope of the present invention as set forth in the hereafter appended claims.

The invention claimed is:

1. A method for registering a communications device having a permanent communication address in a communications network, the method comprising:
coupling said communication device with said communications network, wherein said communications network is a UMTS network, by:
negotiating, between the communications device and at least one registration unit of the communication network, at least one additional temporary communications address which is different from said permanent address and is valid only for a predetermined utilization period, wherein the registration unit is a Registrar according to a Session Initiation Protocol of the UMTS network or a Serving Call Session Control Function of the UMTS network;

registering the additional temporary communications address by the registration unit for the utilization period;

establishing a connection between said communications device and said communications network under said temporary communications address;

proposing the at least one additional temporary communications address for registration by the registration unit by the communications device;

transmitting the proposed at least one temporary communications address by the communications device via a registration signal to the registration unit;

assigning a priority by the communications device to the proposed at least one additional temporary communications address, wherein the priority determines a sequence of registration; and transferring the assigned priority together with the proposed at least one additional temporary communications address in the registration signal to the registration unit.

2. A method for registering a communications device in a communications network as claimed in claim 1, wherein a respective temporary communications address transmitted in each case is registered by the registration unit only if the respective temporary communications address is still freely allocatable for the utilization period.

3. A method for registering a communications device in a communications network as claimed in claim 1, the method further comprising generating the at least one temporary communications address by the registration unit for the communications device even if the at least one temporary communications address transmitted by the communications device has already been allocated.

4. A method for registering a communications device in a communications network as claimed in claim 1, wherein successful registration of a respective temporary communications address is communicated to the communications device by the registration unit with aid of a confirmation signal.

5. A method for registering a communications device in a communications network as claimed in claim 1, the method further comprising allocating a reference right by one of the communications device and the registration unit for interrogation of a respective temporary communications address, generated in each case, by a further communications device.

6. A method for registering a communications device in a communications network as claimed in claim 1, wherein, in the communications network, a respective temporary communications address, in each case, is associated with a dynamic contact address of the communications device.

7. A method for registering a communications device in a communications network as claimed in claim 6, wherein the dynamic contact address is formed by a dynamic IP address of the registering communications device.

8. A method for registering a communications device in a communications network as claimed in claim 1, wherein a Public User Identity address is generated and used as a respective temporary communications address of the communications device.

9. A method for registering a communications device in a communications network as claimed in claim 8, wherein the Public User Identity address is one of a Session Initiation Protocol Uniform Resource Identifier and a Telephone Uniform Resource Locator.

10. A method for registering a communications device in a communications network as claimed in claim 8, wherein the PUID address is accommodated in one of a "To" header field, a separate header field, and a body of an SIP message.

11. A method for registering a communications device in a communications network as claimed in claim 1, the method further comprising allocating a reference right, in each case, by one of the communications device and the registration unit for one of interrogating and delivering a respective temporary communications address generated in each case within a communications service.

12. A method for registering a communications device in a communications network as claimed in claim 1, wherein after expiration of said predeterminable utilization period, said communications device cannot be further addressed within said communication network under said temporary communications address.

* * * * *